Nov. 5, 1963 P. R. MEYER 3,109,617
DEVICE FOR MOUNTING CAMERAS ON TRIPODS
Filed Aug. 22, 1960

PETER R. MEYER
INVENTOR

BY Mason Graham

ATTORNEYS

# United States Patent Office 3,109,617
Patented Nov. 5, 1963

3,109,617
DEVICE FOR MOUNTING CAMERAS
ON TRIPODS
Peter R. Meyer, 1842 Bradbury Ave., Duarte, Calif.
Filed Aug. 22, 1960, Ser. No. 51,086
3 Claims. (Cl. 248—186)

My present invention has to do with an improved adapter device for quickly mounting one element on another and for quickly demounting the elements. While my invention is useful wherever such an adapter device is desirable, one of its principal uses is for mounting a Camera on and demounting it from a conventional tripod, and by way of explaining my invention I shall describe it for that use, although I do not wish to limit the invention to that particular use.

Cameras are conventionally provided with a threaded socket to receive a thumb screw carried by a tripod, for securing the camera on the tripod; and it is an object of my invention to provide an adapter which, for instance, may be interposed between the tripod and camera and which may be quickly and firmly attached to the tripod and which also may be quickly and firmly attached to the camera in a manner which will permit controlled rotative adjustment of the camera relative to the tripod as well as to permit quick removal of the camera from the tripod when desired.

More particularly, it is an object to provide an adapter device of this character which includes a base having means for attaching it to a tripod or other camera support, and having in its top portion a cylindrical cavity for rotatively mounting a camera-engaging rotor having a threaded portion to threadedly engage in the threaded socket in the camera, in combination with novel means for releasably locking the camera-engaging rotor.

Other objects and advantages of my invention will appear hereinafter.

While I shall point out in the appended claims the features which I believe to be new, by way of example I shall now describe a presently preferred embodiment of the invention, for which purpose I shall refer to the accompanying drawing wherein:

Figure 1:
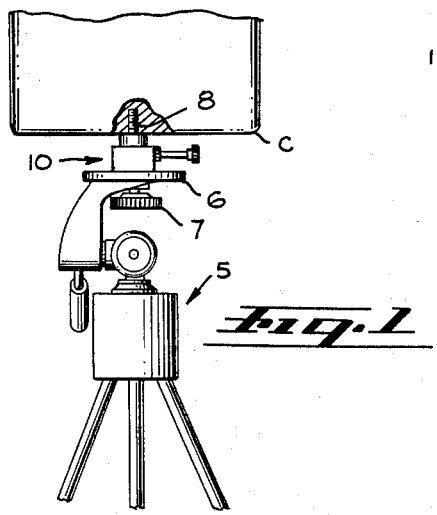
FIG. 1 is a side elevational view, partly in section, showing my adapter in use between a conventional tripod and a camera.
Figure 2:
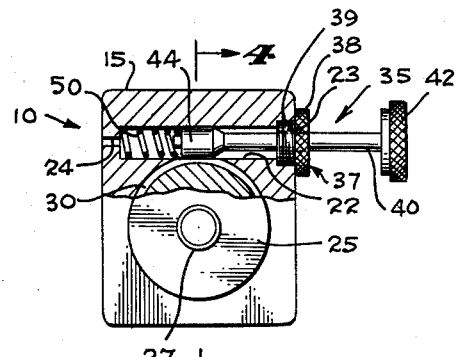
FIG. 2 is a top plan view of the adapter with part being shown in section.
Figure 3:
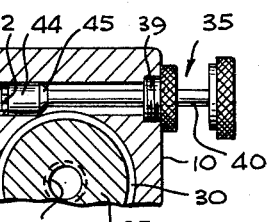
FIG. 3 is a fragmentary sectional view similar to FIG. 2 except that parts are shown in a relatively different position.
Figure 4:
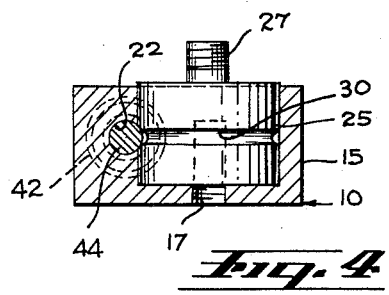
FIG. 4 is a section taken on line 4—4 of FIG. 2.
Figure 6:
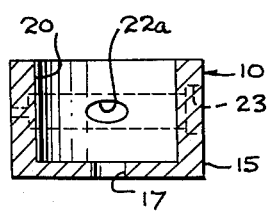
FIG. 6 is a view taken on line 6—6 of FIG. 5 but without the rotor being shown.
Figure 5:
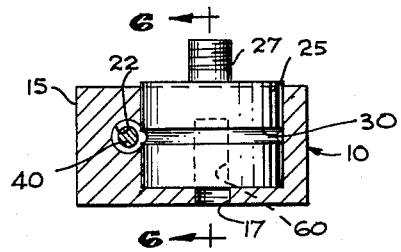
FIG. 5 is a view partly in section and partly in elevation showing the rotor in unlocked position.

Referring now to the accompanying drawing, the numeral 5 generally denotes a conventional tripod device having a head plate 6 threadedly carrying the conventional thumb nut 7 which conventionally is threaded into the threaded socket 8 provided in the bottom wall of a camera C (FIG. 1). My adapter device, generally denoted 10, is more particularly illustrated in FIGS. 2–6, and includes a body 15, preferably made of metal and being preferably rectangular in plan, although the body may be of any desired shape. In the bottom of the body I provide a threaded hole 17 to receive the thumb screw 7 carried by the head plate of the tripod.

The body 15 also has an upwardly opening, cylindrical cavity 20 and has a transverse bore 22, a limited oval shaped portion of which bore, intersects the cavity as shown at 22a. Said bore has an enlarged diameter, threaded, outer end portion 23 and may also have a reduced diameter inner end portion 24.

Rotatively and snugly fitting in the cavity 20, there is a camera-engaging rotor 25 which has an upwardly projecting threaded portion 27 for threadedly engaging the socket 8 in the bottom of the camera C. Also the rotor 25 has, between its ends and in register with the portion 22a of the bore, an annular peripheral groove 30 of semicircular cross section, for the purpose to be hereinafter described. Preferably the rotor is slightly longer than the depth of the cavity so as to prevent contact of the camera with the body 15.

A locking plunger 35 is axially movably mounted in the bore 22 and in a bearing member 37, which latter member has a knurled outer end portion 38 and a reduced diameter, externally threaded inner end portion 39 for engaging the threaded portion 23 of the bore 22. The plunger has a shank portion 40 carrying a knurled head 42 to facilitate manual manipulation of the plunger, and has a relatively large diameter inner end portion 44 whose outer end extremity portion is tapered at 45. A compression spring 50 is mounted between the inner end of the bore and the inner end of the plunger so that it normally urges the plunger outwardly of the bore. The inner portion of the plunger may have a reduced diameter portion 52 to project into the spring.

The operation of my adapter may be described as follows:

The body 15 is secured to the tripod by threading the thumb screw 7 into the hole 17. The rotor 25 may be attached to the camera before the rotor is mounted in the socket 20, and then inserted in the socket after first pushing inwardly on the plunger to move the enlarged portion 44 of the latter from the position of FIG. 2 to the position of FIG. 3, in which latter position the plunger portion 44 is not in position to engage in the groove 30 of the rotor. Then by releasing the plunger, the spring moves the plunger outwardly to the position of FIG. 2, in which the plunger portion 44 engages in the groove 30 through the portion 22a of the bore 22. When the parts are in that position, the rotor is locked against either axial or rotative movement relative to the body. Thus it is apparent that the user may, by pushing inwardly on the plunger, allow the rotor and its carried camera to be rotated relative to the body and tripod without having to manipulate the conventional tripod adjustments. Upon release of manual pressure on the plunger the spring will automatically return it to the rotor locking position. It is also apparent that the user may, if desired, fully withdraw the rotor from the body cavity so that it may remain permanently attached to the camera, if desired.

It will be apparent that the body 15 may be formed as an integral part of the head plate C of the tripod, thus eliminating the necessity of the attaching thumb screw 7 and the threaded hole 17 in the body.

It is also my preference to provide an axial, threaded bore 60 in the rotor, opening through the bottom end of the rotor, to threadedly receive a flash attachment (not shown) when the camera carried rotor is detached from the body.

I claim:

1. In an adapter for mounting a camera on a tripod, a body carried by said tripod, said body having an upwardly opening cavity of cylindrical cross section and having a transverse bore a limited portion of which, intermediate its ends, tangentially intersects said cavity, a camera-engaging rotor coaxial with and mounted in said cavity for rotative and axial movement relative to said body and having a peripheral groove in register with said cavity intersecting portion of said bore, and a plunger axially movably mounted in said bore, said plunger having an outer end portion of smaller diameter than said bore and having a relatively enlarged diameter inner end portion of substantially the diameter of said bore whereby, when said plunger is axially moved in said bore to a point at which said relatively enlarged portion of said plunger is within the said portion of said bore which intersects said cavity, said relatively enlarged portion will engage in said peripheral groove and lock said rotor against movement relative to said body.

2. The adapter of claim 1 which additionally includes a bearing member for the outer end portion of said plunger threadedly secured in the outer end of said bore.

3. The adapter of claim 1 which additionally includes spring means in said bore engaging and yieldably urging said relatively enlarged portion of said plunger into locking engagement with said rotor.

References Cited in the file of this patent
UNITED STATES PATENTS

| | | |
|---|---|---|
| 2,448,278 | Roming | Aug. 31, 1948 |
| 2,506,878 | Kraus | May 9, 1950 |
| 2,626,821 | Bouget et al. | Jan. 27, 1953 |